(12) United States Patent
Schmidt

(10) Patent No.: US 7,162,719 B2
(45) Date of Patent: Jan. 9, 2007

(54) METHOD AND APPARATUS FOR AGGREGATE RESOURCE MANAGEMENT OF ACTIVE COMPUTING ENVIRONMENTS

(75) Inventor: Brian Keith Schmidt, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 750 days.

(21) Appl. No.: 09/765,886

(22) Filed: Jan. 18, 2001

(65) Prior Publication Data

US 2002/0095500 A1 Jul. 18, 2002

(51) Int. Cl.
*G06F 9/46* (2006.01)
*G06F 15/16* (2006.01)
*G06F 9/44* (2006.01)

(52) U.S. Cl. .............. 718/104; 709/201; 709/202; 709/229; 717/100; 718/100; 710/56

(58) Field of Classification Search ................ 709/202, 709/226, 224, 201, 229; 719/315; 718/106, 718/100, 104; 710/56; 717/100
See application file for complete search history.

(56) References Cited

U.S. PATENT DOCUMENTS

| | | | | |
|---|---|---|---|---|
| 6,061,795 A * | 5/2000 | Dircks et al. | ............... | 713/201 |
| 6,247,109 B1 * | 6/2001 | Kleinsorge et al. | ......... | 711/153 |
| 6,363,411 B1 * | 3/2002 | Dugan et al. | ............... | 709/202 |
| 6,477,698 B1 | 11/2002 | Shalish | ........................ | 716/18 |
| 6,496,847 B1 * | 12/2002 | Bugnion et al. | ............ | 718/108 |
| 6,496,871 B1 * | 12/2002 | Jagannathan et al. | ....... | 709/202 |
| 6,698,017 B1 * | 2/2004 | Adamovits et al. | ......... | 717/168 |
| 6,795,966 B1 * | 9/2004 | Lim et al. | ................... | 718/100 |

OTHER PUBLICATIONS

"Technical White Paper", WMware, Inc. Feb. 1999.*
Schrimpf, Harald, "Migration of Processes, Files, and Virtual Devices in the MDX Operating System," ACM SIGOPS vol. 29, Issue 2 (Apr. 1995).

* cited by examiner

*Primary Examiner*—Saleh Najjar
*Assistant Examiner*—B R Bruckart
(74) *Attorney, Agent, or Firm*—Martine Penilla & Gencarella, LLP

(57) ABSTRACT

The present invention is for aggregate resource management of active computing environments. According to one or more embodiments of the present invention a compute capsule is provided. A capsule encapsulates an active computing environment. An active computing environment comprises one or more processes and the complete state necessary for the execution of those processes. Within the operating system, compute capsules are promoted to first class objects. Once promoted to first class object status, the compute capsule can be assigned resources, subjected to auditing constraints, and subjected to security policies. In one embodiment, resource management algorithms are applied to the promoted compute capsules. In another embodiment, a compute capsule that encapsulates a user's computing session can be assigned a guaranteed share of computing resources. In another embodiment, compute capsules are restricted from accessing the network or certain portions of the file system.

18 Claims, 13 Drawing Sheets

METHOD AND APPARATUS FOR AGGREGATE RESOURCE MANAGEMENT OF ACTIVE COMPUTING ENVIRONMENTS

BACKGROUND OF THE INVENTION

1. Field of the Invention

The present invention relates to managing the resources that are assigned to active computing environments.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

In modern computing it is desirable for a user to be interacting with a computer, to stop the interaction with the computer, to move to a new computer, and to begin interacting with the new computer at precisely the point where the user stopped interacting with the first computer. Using current schemes, however, this is not always possible because the user's computing environment cannot be represented in a form that can be understood by both computers and moved between the computers.

However, in co-pending U.S. Patent application entitled "Method and Apparatus for Representing and Encapsulating Active Computing Environments" application No. 09/764,771, filed on Jan. 16, 2001, assigned to the assignee of the present application, and hereby fully incorporated into the present application by reference, it was described how a group of active processes and their associated state could be represented in a form that made it possible to halt the active processes, to move them to a different binary compatible machine, or to suspend them on disk for later revival on the same or a different machine.

In this context, it would be desirable for the user to know exactly how the new computer will assign the resources needed for the user's interaction (i.e., will the new computer be more or less responsive to the user's needs). Using current schemes, however, this is not possible because current schemes assign resources to individual processes only and provide no mechanism to assign resources to groups of processes. Before further discussing the drawbacks of current schemes, it is instructive to discuss how the nature of computing is changing.

The Nature of Computing

The nature of computing is changing. Until recently, modern computing was mostly "machine-centric", where a user accessed a dedicated computer at a single location. The dedicated computer had all the data and computer programs necessary for the user to operate the computer, and ideally, it had large amounts of hardware, such as disk drives, memory, processors, and the like. With the advent of computer networks, however, different computers have become more desirable and the focus of computing has become "service-oriented". In particular, computer networks allow a user to access data and computer programs that exist elsewhere in the network. When the user accesses such data or computer programs, the remote computer is said to be providing a service to the user. With the improvement in services available to users, the need to have a dedicated computer following the machine-centric paradigm is greatly reduced. The machine-centric paradigm also becomes much less practical in this environment because distributing services is much more cost-effective.

In particular, computers in a service-oriented environment have little need for powerful hardware. For instance, the remote computer processes the instructions before providing the service, so a powerful processor is not needed on the local access hardware. Similarly, since the service is providing the data, there is little need to have large capacity disk drives on the local access hardware. In such an environment, one advantage is that computer systems have been implemented that allow a user to access any computer in the system and still use the computer in the same manner (i.e., have access to the same data and computer programs).

For instance, a user may be in location A and running a word processor, a web browser, and an interactive multimedia simulation. In a service-oriented environment, the user might stop using the computer in location A and move to location B where the user could resume these computer programs on a different machine at the exact point where the user stopped using the machine at location A, as long as both computers had access via the computer network to the servers where the programs were being executed. The programs in this example, however, cannot be moved between computers when they are active because of the design of current operating systems.

Current Operating Systems

Using current operating systems, it is possible in a shared computing environment to ensure performance guarantees for or apply security policies to individual processes. There is, however, no means for treating groups of processes as units. Thus, groups of processes cannot have performance guarantees applied to them. Likewise, groups of processes cannot be subjected to security policies, such as network access restrictions, file access restrictions, resource access restrictions, and server access restrictions. In addition, access rights cannot be assigned to a group of users working in a common environment. In short, the prior art offers no manner in which to manage a group of processes owned by a single user as a single resource.

SUMMARY OF THE INVENTION

The present invention is for aggregate resource management of active computing environments. According to one or more embodiments of the present invention a compute capsule is provided. A capsule encapsulates an active computing environment. An active computing environment comprises one or more processes and the complete state necessary for the execution of those processes.

Within the operating system, compute capsules are promoted to first class objects. First class objects can be assigned resources, subjected to auditing constraints, and subjected to security policies. Once promoted to first class object status, the processes within the compute capsule are collectively assigned resources subjected to auditing constraints, and subjected to security policies.

In one embodiment, resource management algorithms are applied to the promoted compute capsules. In another embodiment, a compute capsule that encapsulates a user's computing session can be assigned a guaranteed share of computing resources. This has the effect of giving the user performance isolation from other users. In this way, users can move their active computing environments between computers and not risk having the performance level on the new computer reduced.

In another embodiment, compute capsules are restricted from accessing the network or certain portions of the file system. This creates a safe environment for a public kiosk or an un-trusted outside user. This also enables compute capsules to cross administrative domains without compromising the local system. In another embodiment, once the resources are assigned to the capsule, the capsule or the operating system distributes the resources hierarchically among the individual processes in the capsule.

BRIEF DESCRIPTION OF TEE DRAWINGS

These and other features, aspects and advantages of the present invention will become better understood with regard to the following description, appended claims and accompanying drawings where:

Figure 10:
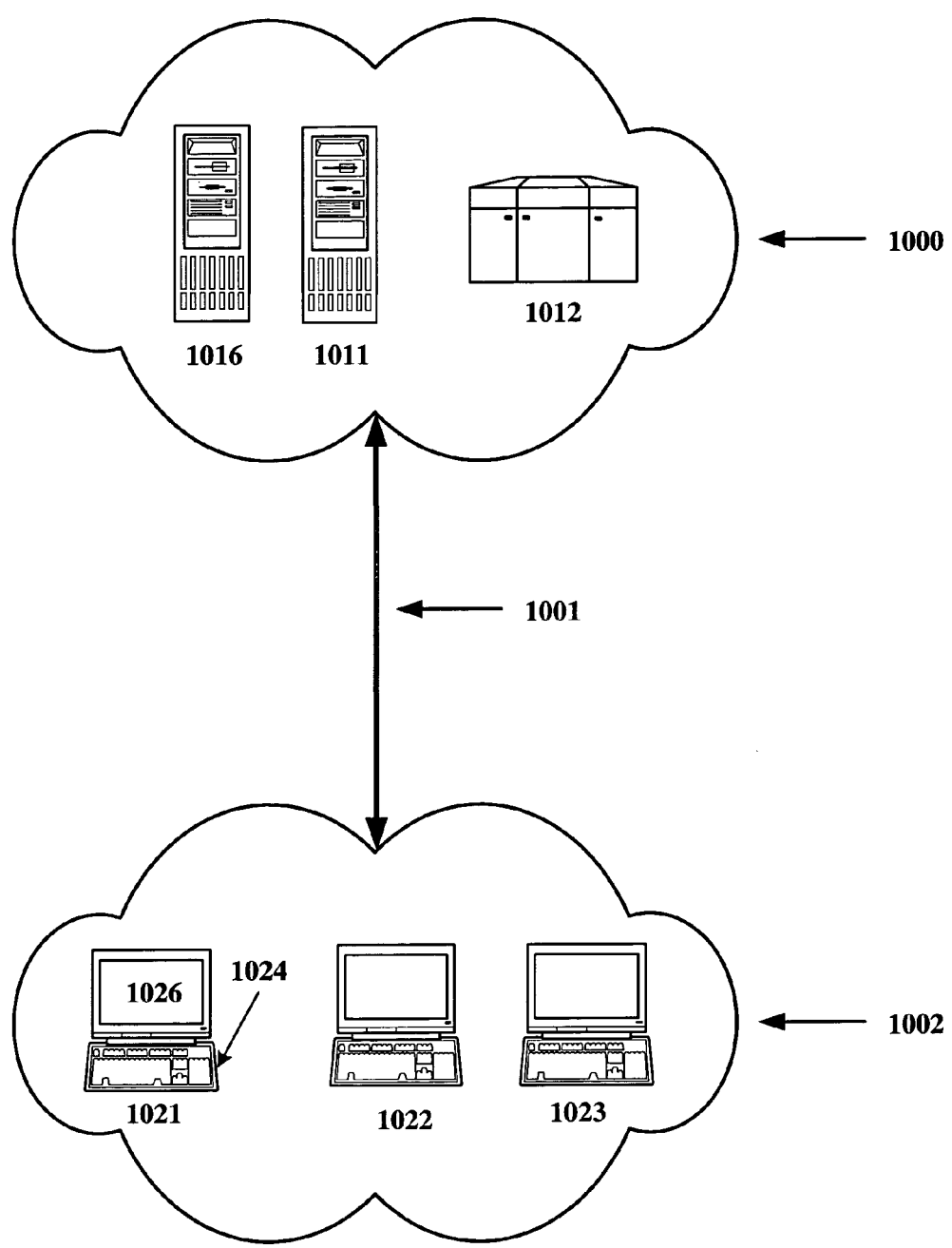

FIG. 10 displays the partitioning of the functionality of the virtual desktop system architecture.

Figure 11:
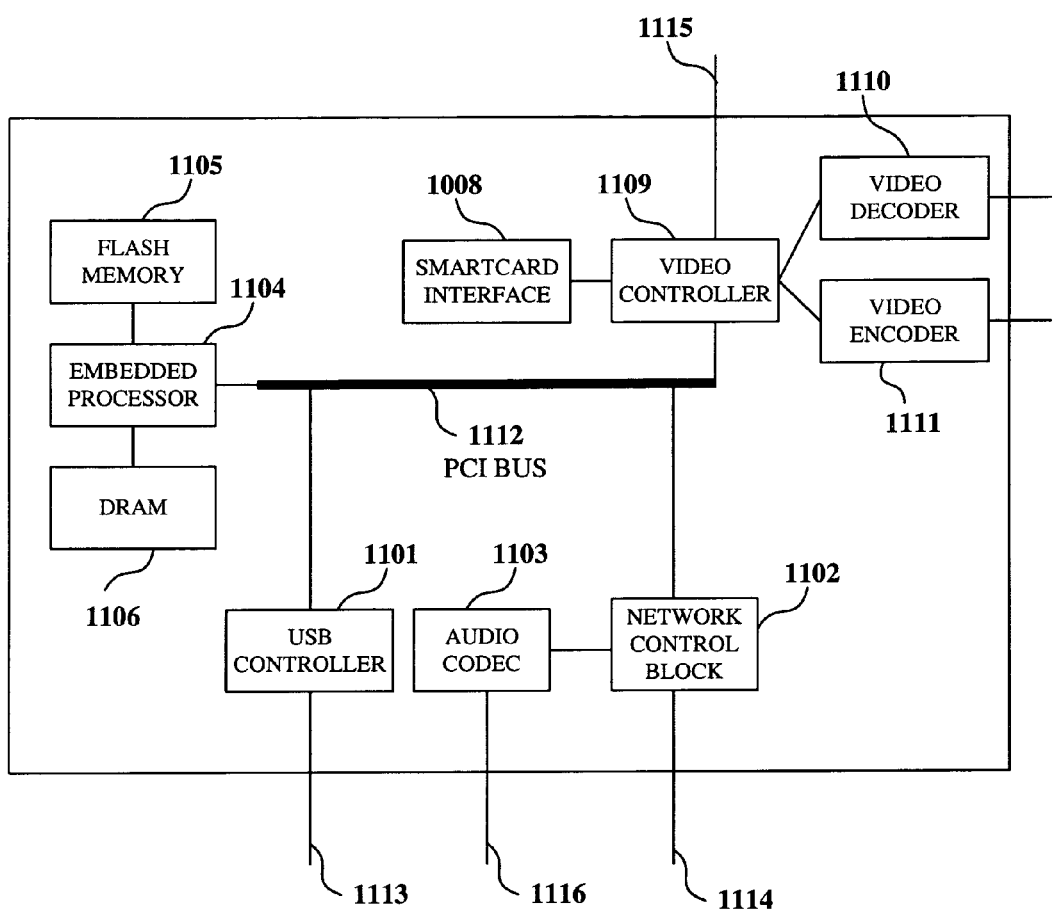

FIG. 11 is a block diagram of an example embodiment of a human interface device.

Figure 12:
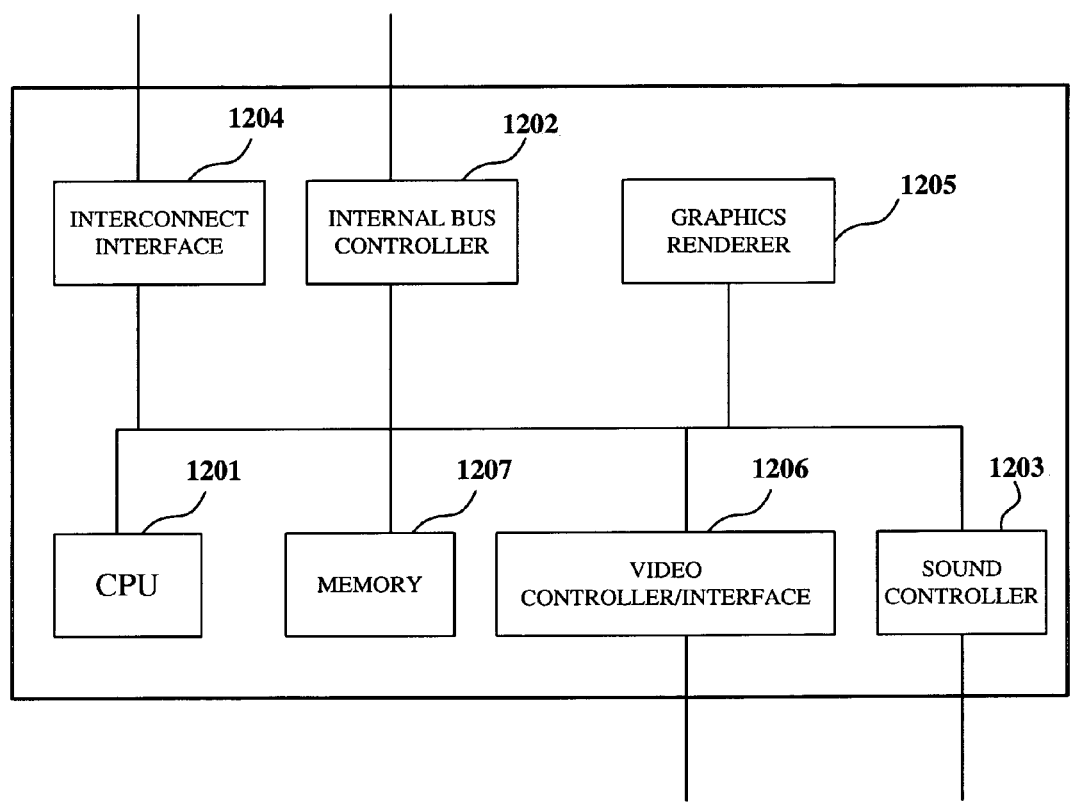

FIG. 12 is a block diagram of a single chip implementation of a human interface device.

Figure 13:
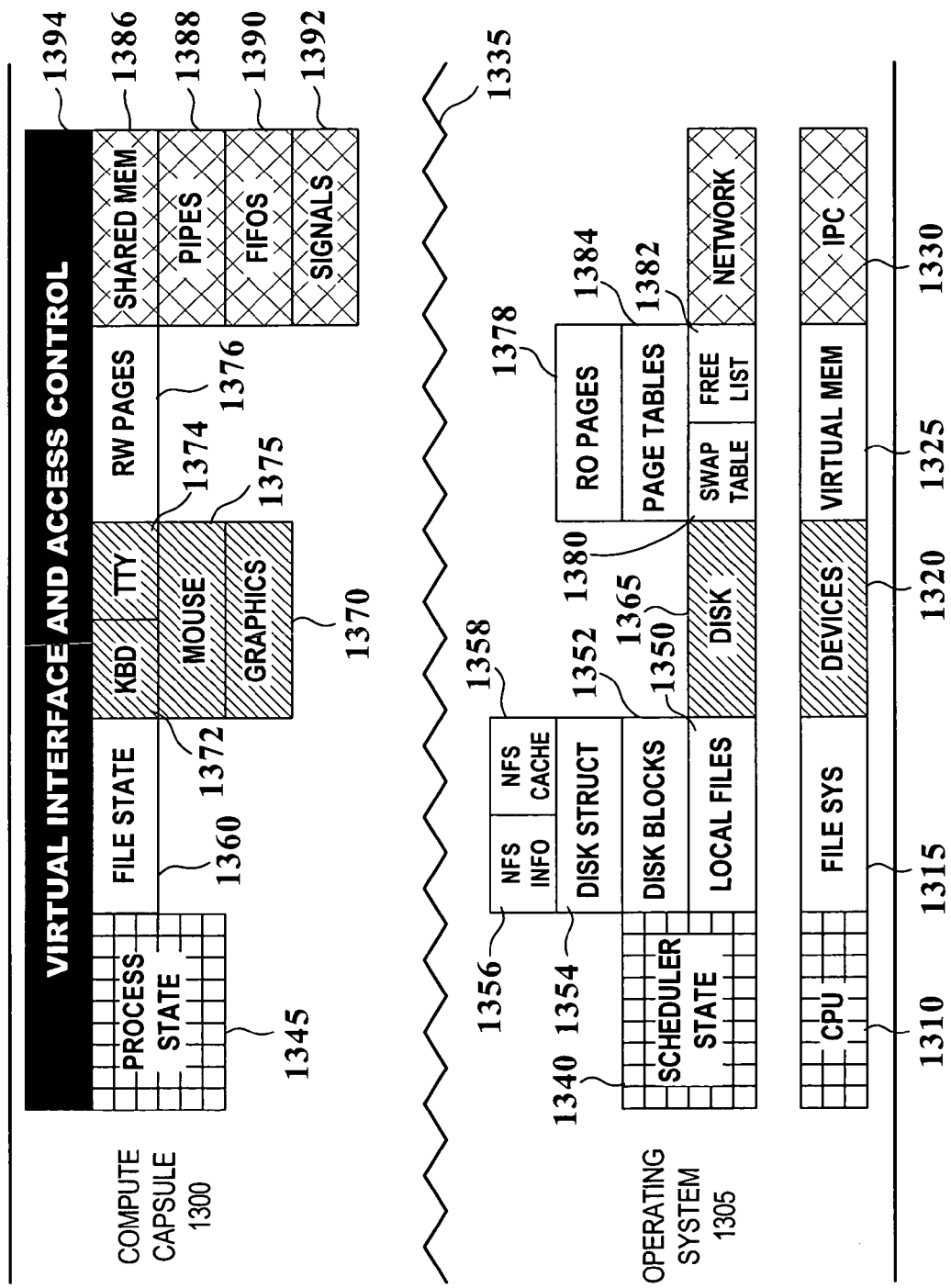

FIG. 13 is a block diagram showing the re-partitioning of functionality between the operating system and the compute capsule.

DETAILED DESCRIPTION OF THE INVENTION

The invention is for the aggregate resource management of an active computing environment. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Compute Capsules

A compute capsule comprises one or more processes and their associated system environment. A compute capsule is configured to provide an encapsulated form that is capable of being moved between computers or stored off-line, for instance on a disk drive or other non-volatile storage medium. The system environment in a capsule comprises state information relating to exactly what the processes are doing at any given time in a form that is understandable by any binary compatible machine. System environment information may include, for instance, privileges, configuration settings, working directories and files, assigned resources, open devices, installed software, and internal program state.

Processes in the same capsule may communicate with each other and share data, for instance using pipes, shared memory, or signals. Communication with processes outside the capsule, on the other hand, is restricted to Internet sockets and globally shared files. This ensures that capsules can move without restriction. For example, a pipe between processes in different capsules would force both capsules to reside on the same machine, but a socket can be redirected. The use of compute capsules is completely transparent, and applications need not take any special measures, such as source code modification, re-compilation, or linking with special libraries. In addition, a system using compute capsules can seamlessly inter-operate with systems that do not.

Re-Partitioning the Operating System

To provide such functionality, the traditional operating system is re-partitioned as shown in FIG. 13 so that all host-dependant and personalized elements of the computing environment are moved into the capsule 1300, while leveraging policies and management of the shared underlying system 1305. The computing environment comprises CPU 1310, file system 1315, devices 1320, virtual memory 1325, and IPC 1330. Each of these components of the computing environment have been partitioned as indicated by the curved line 1335.

The state of the CPU scheduler 1340 is left in the operating system 1305. This state comprises information that the operating system maintains so that it knows which processes may run, where they are, what priority they have, how much time they will be granted processor attention, etc. Process state 1345, which is moved to the compute capsule 1300, has process-specific information, such as the values in the registers, the signal handlers registered, parent/child relationships, access rights, and file tables. The file system 1315 leaves local files 1350 that are identically available on all machines, (e.g., /usr/bin or /man on a UNIX system) in the operating system 1305. The file system 1315 further leaves disk blocks 1352 outside the capsule, which are caches of disk blocks that are read into the system and can be later used when needed to be read again. The disk structure 1354 is also left outside the capsule. The disk structure is specific to an operating system and serves as a cache of where files are located on the disk, (i.e., a mapping of pathnames to file locations). Network file system (NFS) is a protocol for accessing files on remote systems. The operating system maintains information 1356 with respect to the NFS and a cache 1358, which is a cache of files the operating system has retrieved from remote servers and stored locally. Similar state is maintained for other network based file systems.

What has been partitioned away from the operating system is the file state 1360. The file state 1360 is moved to the capsule 1300. The file state 1360 is the state of a file that some process in the capsule has opened. File state 1360 includes, for instance, the name of the file and where the process currently accessing the file. If the file is not accessible via the network (e.g., stored on a local disk), then its contents are placed in the capsule.

Devices 1320 are components that are attached to the computer. For each device there is a driver that maintains the state of the device. The disk state 1365 remains in the operating system 1305. The other device components are specific to a log-in session and are moved to the capsule 1300. The other devices include a graphics controller state 1370, which is the content that is being displayed on the screen, for instance the contents of a frame buffer that holds color values for each pixel on a display device, such as a monitor.

Keyboard state 1372 and mouse state 1375 includes the state associated with the user's current interaction with the keyboard, for instance whether caps lock is on or off and with the screen, for instance where the pointer is currently located. Tty state 1374 includes information associated with the terminals the user is accessing, for instance if a user opens an Xwindow on a UNIX system or if a user telnets or performs an rlogin. Tty state 1374 also includes information about what the cursor looks like, what types of fonts are displayed in the terminals, and what filters should be applied to make the text appear a certain way, for instance.

Virtual memory 1325 has state associated with it. The capsule tracks the state associated with changes made from within the capsule which are termed read/write pages 1376. Read-only pages 1378 remain outside the capsule. However, in one embodiment read-only pages 1378 are moved to the capsule as well, which is useful in some scenarios. For instance, certain commands one would expect to find on a new machine when their capsule migrates there may not be available. Take, for instance, a command such as ls or more on a UNIX system. Those read-only pages may not be necessary to bring into the capsule when it is migrating between UNIX machines, because those pages exist on every UNIX machine. If, however, a user is moving to a machine that does not use those commands, it is useful to move those read only pages into the capsule as well. The swap table 1380, which records what virtual memory pages have been replaced and moved to disk, remains outside the capsule as do the free list 1382, (which is a list of empty virtual memory pages), and the page table 1384.

Nearly all IPC 1330 is moved into the capsule. This includes shared memory 1386, which comprises a portion of memory that multiple processes may be using, pipes 1388, fifos 1390, signals 1392, including handler lists and the state needed to know what handler the process was using and to find the handler. Virtual interface and access control 1394 is useful for separating the capsule from host-dependent information that is specific to a machine, such as the structure of internal program state or the IDs for its resources. The interface 1394 refers generally to the virtualized naming of resources and translations between virtual resource names and physical resources, as well as lists that control access to processes trying to access capsules.

Thus, capsule state includes data that are host-specific, cached on the local machine to which the capsule is bound, or not otherwise globally accessible. This includes the following information:

Capsule State: Name translation tables, access control list, owner ID, capsule name, etc.;

Processes: Tree structure, process control block, machine context, thread contexts, scheduling parameters, etc.;

Address Space Contents: Read/write pages of virtual memory; because they are available in the file system, contents of read-only files mapped into the address space (e.g., the application binary and libraries) are not included unless explicitly requested;

Open File State: Only file names, permissions, offsets, etc. are required for objects available in the global file system. However, the contents of personal files in local storage (e.g., /tmp) must be included. Because the pathname of a file is discarded after it is opened, for each process one embodiment of the invention maintains a hash table that maps file descriptors to their corresponding pathnames. In addition, some open files have no pathname, (i.e., if an unlink operation has been performed). The contents of such files are included in the capsule as well;

IPC Channels: IPC state has been problematic in most prior systems. The present invention adds a new interface to the kernel modules for each form of IPC. This interface includes two complementary elements: export current state, and import state to re-create channel. For example, the pipe/fifo module is modified to export the list of processes attached to a pipe, its current mode, the list of filter modules it employs, file system mount points, and in-flight data. When given this state data, the system can re-establish an identical pipe.

Open Devices: By adding a state import/export interface similar to that used for IPC, the invention supports the most commonly used devices: keyboard, mouse, graphics controller, and pseudo-terminals. The mouse and keyboard have very little state, mostly the location of the cursor and the state of the LEDs (e.g., caps lock). The graphics controller is more complex. The video mode (e.g., resolution and refresh rate) and the contents of the frame buffer must be recorded, along with any color tables or other specialized hardware settings. Supporting migration between machines with different graphics controllers is troublesome, but a standard remote display interface can address that issue. Pseudo-terminal state includes the controlling process, control settings, a list of streams modules that have been pushed onto it, and any unprocessed data.

Capsules do not include shared resources or the state necessary to manage them (e.g., the processor scheduler, page tables), state for kernel optimizations (e.g., disk caches), local file system, physical resources (e.g., the network), etc.

Resource Aggregation Units

To manage the resources of a group of processes in the aggregate, the group of processes must be transformed into a single unit. The group of processes are transformed into such a unit when a compute capsule is created. Then, the compute capsule is promoted to the status of a "first-class object" within the operating system. A first-class object can have its resources managed, and security policies for its member processes can be implemented. This enables the system to treat groups of processes as single units for accounting and resource management decisions, which has three important effects. First, resources available anywhere in the system can be directly assigned to a particular capsule. This may require migrating a capsule between machines, thereby dynamically load-balancing the system. Second, users may demand a guaranteed level of resources or performance isolation from others. This can be achieved by assigning fixed shares of resources to capsules. Third, capsules maybe subjected to policy constraints, such as restrictions or quotas on their resource allocations, or restrictions on network access, certain file system operations, or resource or server access.

Figure 1:
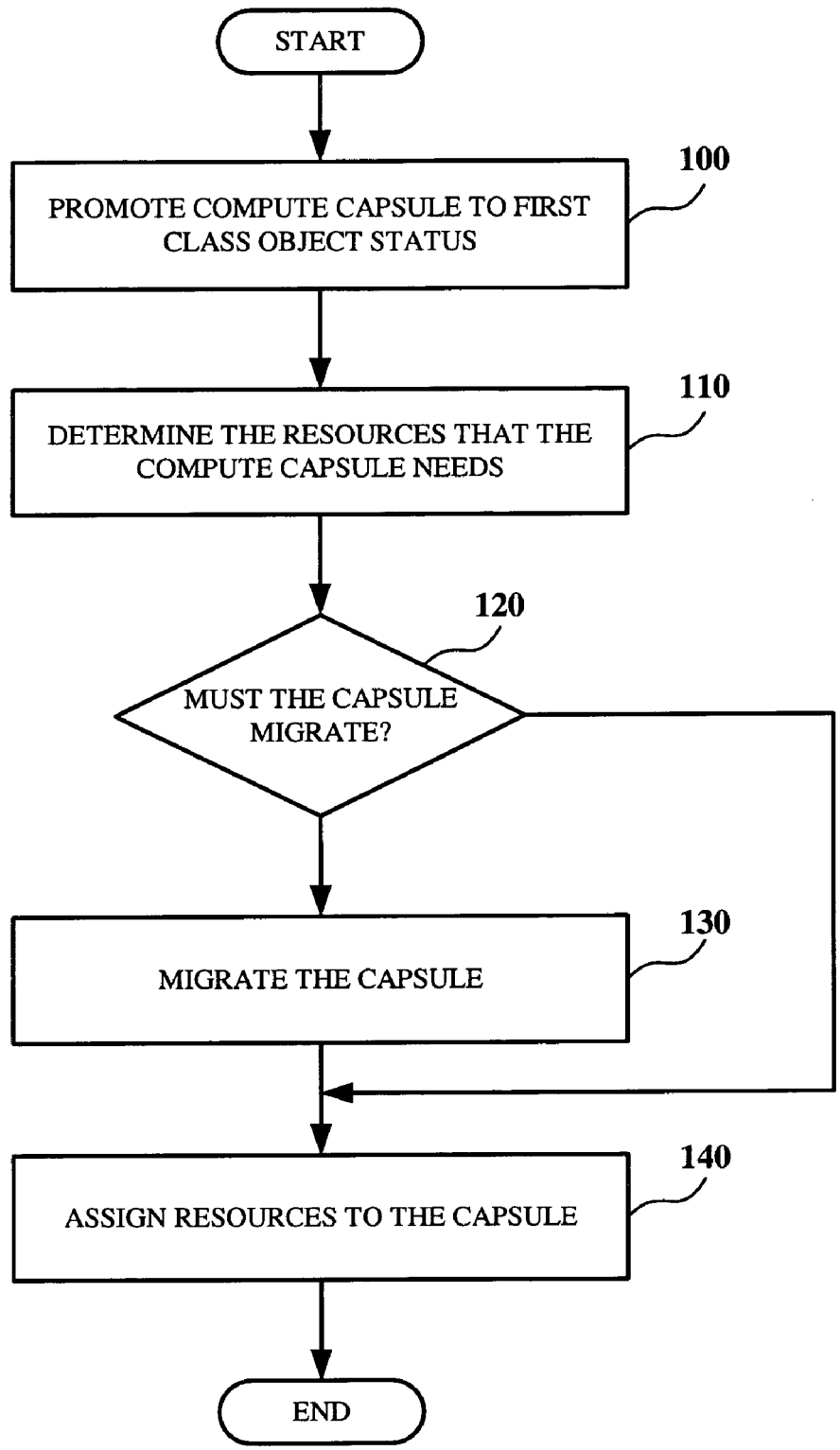
FIG. 1 is a flowchart which describes the allocation of system resources to compute capsules according to an embodiment of the present invention.

FIG. 1 is a flowchart which describes the allocation of system resources to compute capsules according to an embodiment of the present invention. At step 100, a compute capsule is promoted to first-class object status. At step 110, it is determined what resources need to be assigned to the compute capsule. Resources include memory use, processor attention, or the use of a device, for instance. Once the resources that need to be assigned are determined, then it is determined at step 120 if the capsule must migrate to a new machine to receive the needed resources. If it does, the capsule migrates at step 130, and the required resources are assigned at step 140. If the capsule does not need to migrate (i.e., the needed resources are available on the current machine), then the resources are assigned at step 140.

Resource Aggregation

Figure 2:
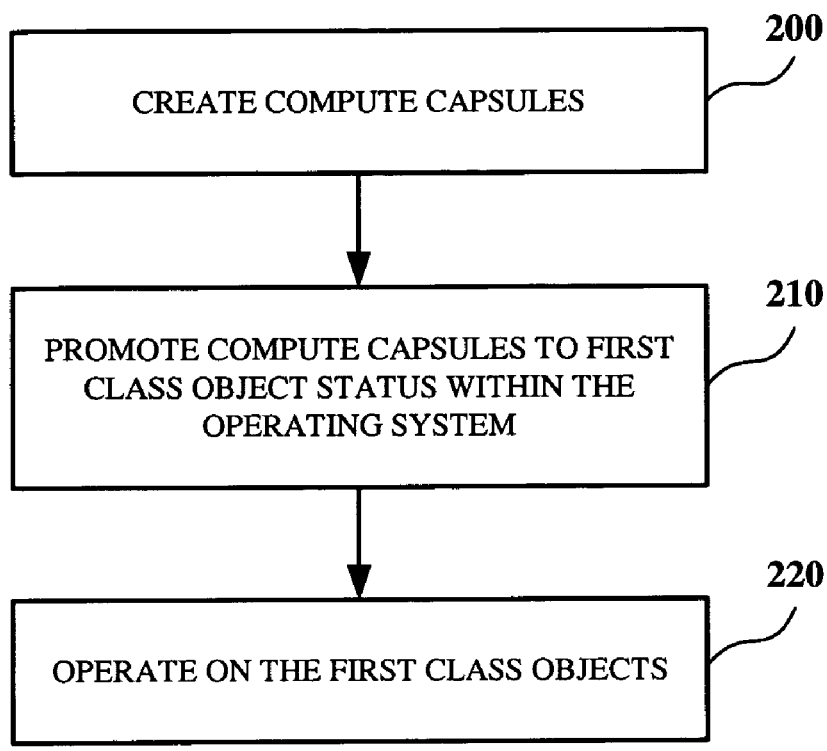
FIG. 2 is a flowchart showing the process of aggregating resources to compute capsules according to an embodiment of the present invention.

Once a resource aggregation unit, such as a capsule, is created, various resource management operations can be performed on the unit. FIG. 2 is a flowchart showing the process of aggregating resources to compute capsules according to an embodiment of the present invention. At step 200, a compute capsule is created. Then, at step 210, the compute capsule is promoted to first class object status. Thereafter, some form of resource management operation is performed on the compute capsule at step 220.

Figure 3:
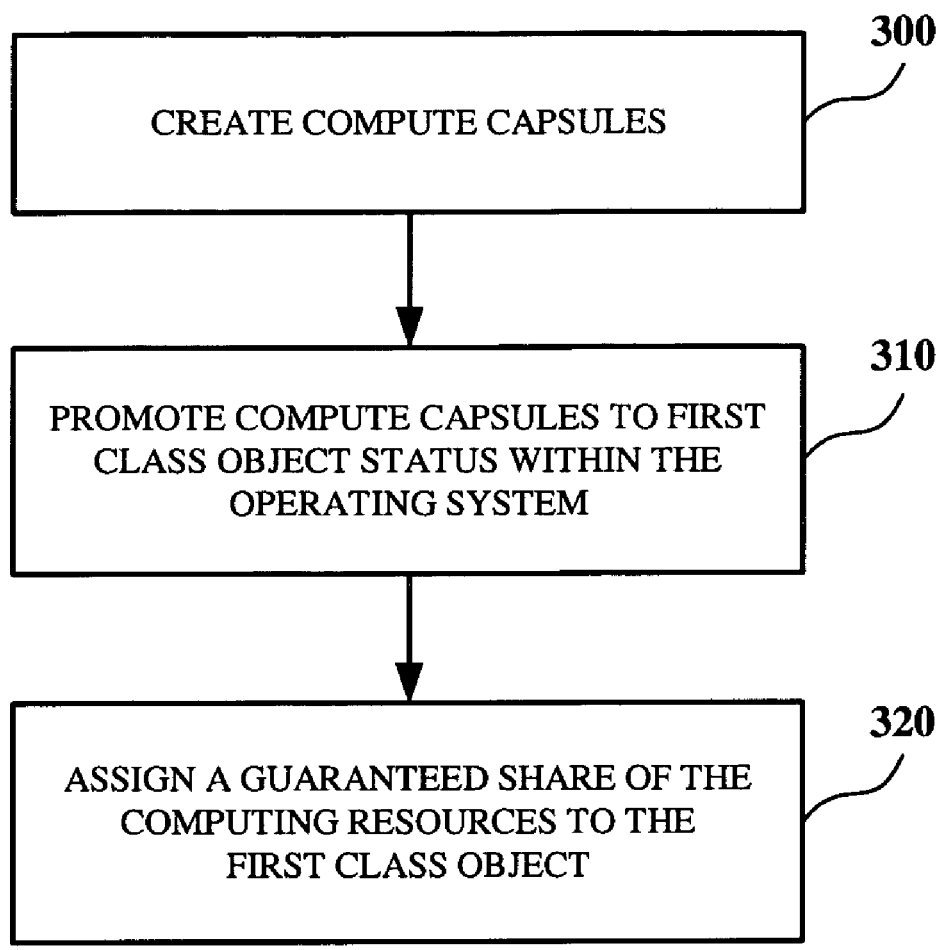
FIG. 3 is a flowchart showing how a guaranteed share of resources can be assigned to a compute capsule according to an embodiment of the present invention.

Some examples of the types of resource management operations that can be performed on compute capsules are shown in FIGS. 3–6. FIG. 3 is a flowchart showing how a guaranteed share of resources can be assigned to a compute capsule according to an embodiment of the present invention. At step 300, a compute capsule is created. Then, at step 310, the compute capsule is promoted to first class object status. Thereafter, a guaranteed share of the resources is assigned to the compute capsule at step 320. Resources include, for instance, memory, processor attention, and a plurality of other types of resources as well.

Figure 4:
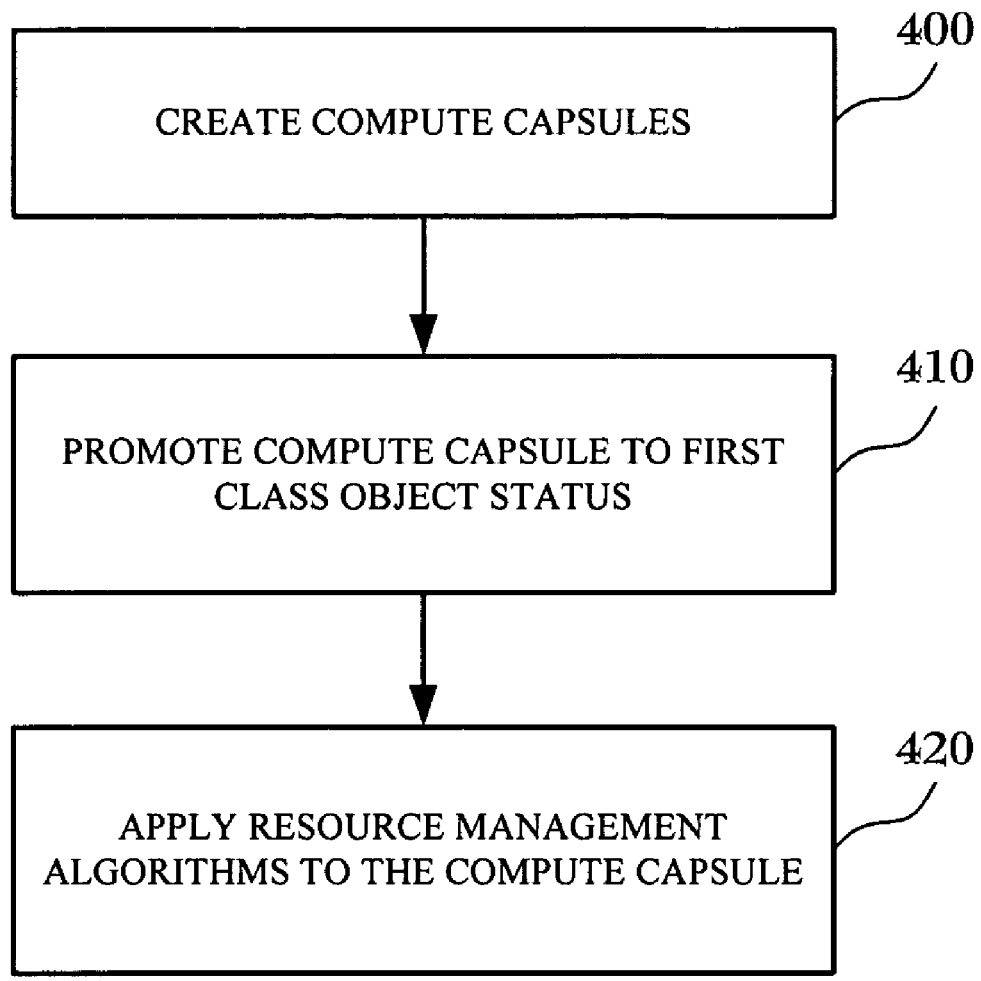
FIG. 4 is a flowchart showing how resource management algorithms can be applied to compute capsules according to an embodiment of the present invention.

FIG. 4 is a flowchart showing how resource management algorithms can be applied to compute capsules according to an embodiment of the present invention. At step 400, a compute capsule is created. Then, at step 410, the compute capsule is promoted to first class object status. Thereafter, resource management algorithms are applied to the compute capsule at step 420.

Figure 5:
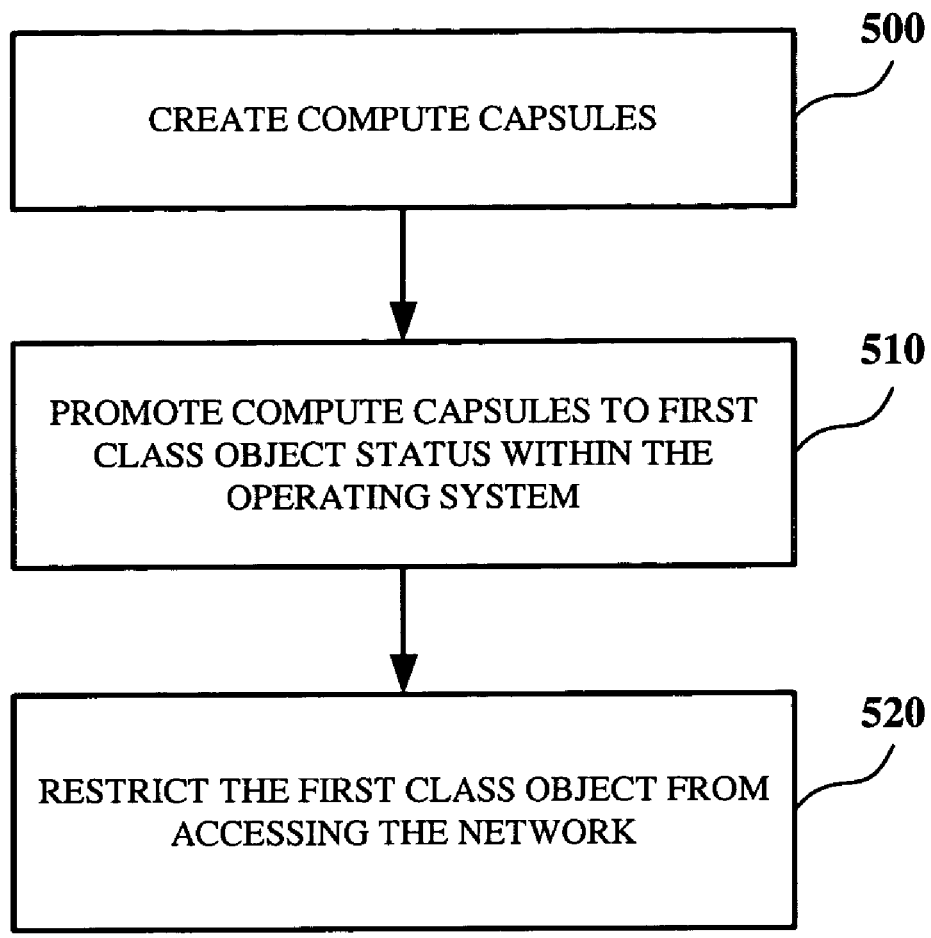
FIG. 5 is a flowchart showing how compute capsules can be restricted from accessing the network according to an embodiment of the present invention.

FIG. 5 is a flowchart showing how compute capsules can be restricted from accessing the network according to an embodiment of the present invention. At step 500, a compute capsule is created. Then, at step 510, the compute capsule is promoted to first class object status. Thereafter, the compute capsule is restricted from accessing the network at step 520. This creates a safe environment for an un-trusted outside user or an unauthorized user.

Figure 6:
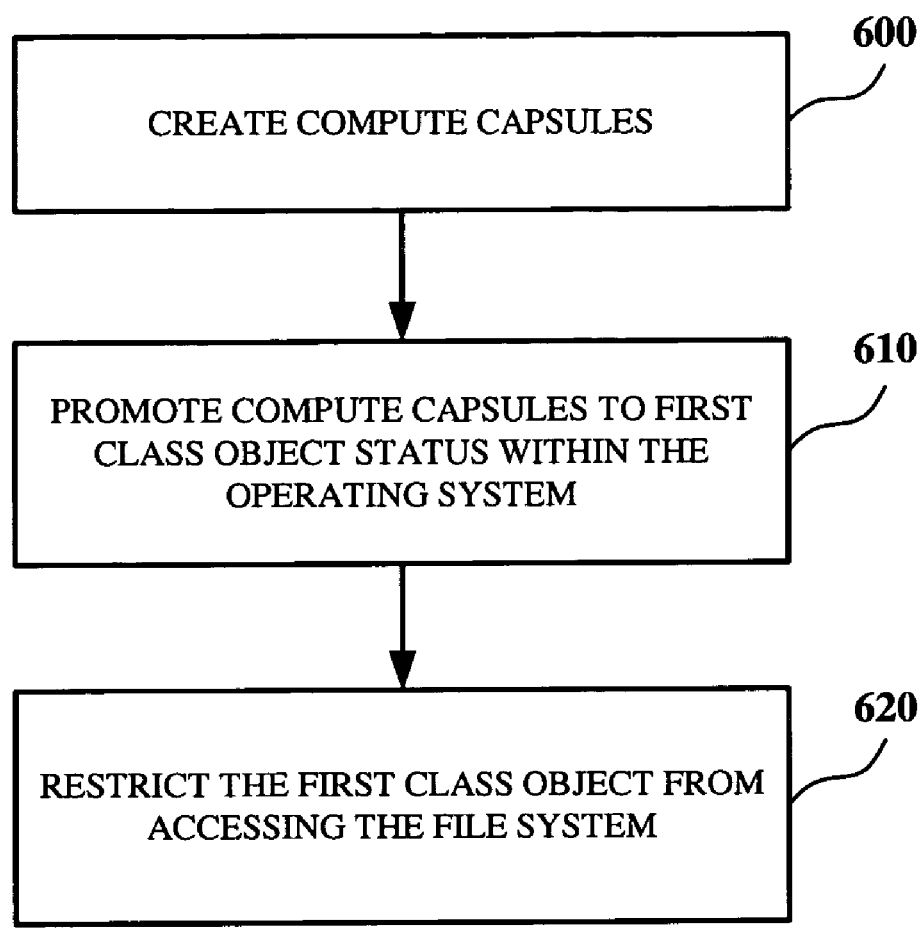
FIG. 6 is a flowchart showing how compute capsules can be restricted from accessing a local file system according to an embodiment of the present invention.

FIG. 6 is a flowchart showing how compute capsules can be restricted from accessing a local file system according to an embodiment of the present invention. At step 600, a compute capsule is created. Then, at step 610, the compute capsule is promoted to first class object status. Thereafter, the compute capsule is restricted from accessing the local file system at step 620. This creates a safe environment for a public kiosk. This also enables compute capsules to cross administrative domains without compromising the local system Hierarchical Resource Management Capsules allow for a hierarchical management of resources. As such, once a block of resources are assigned to a capsule, the capsule or the operating system can then distribute the resources among capsule members and can implement security and accounting policies among the capsule members. This enables a user to have more flexible control over the allocation of resources to the group of processes that are in the capsule, better control over what the capsule members will be permitted to do, and better control over what the capsule members have done.

Figure 7:
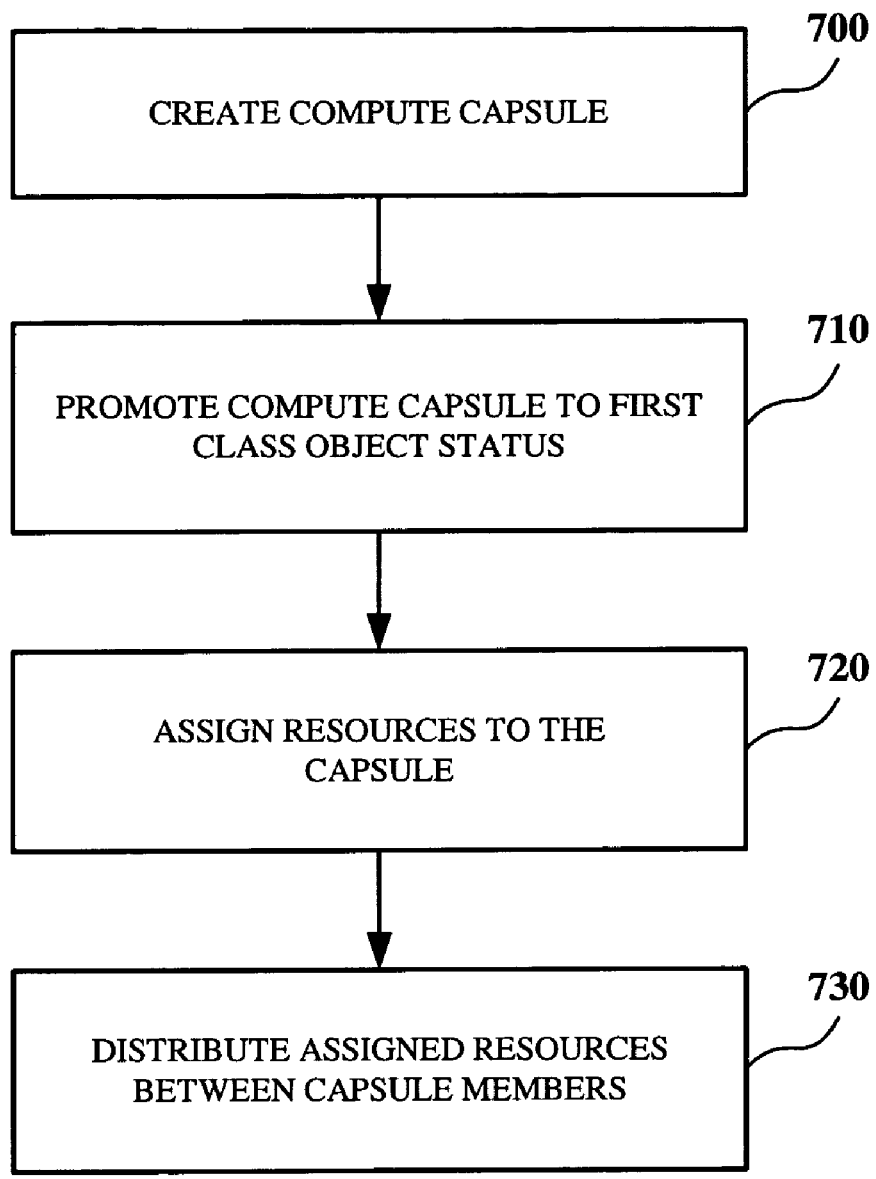
FIG. 7 is a flowchart showing the process of aggregating resources to compute capsules hierarchically according to an embodiment of the present invention.

FIG. 7 is a flowchart showing how compute capsules can hierarchically allocate resources according to an embodiment of the present invention. At step 700, a compute capsule is created. Then, at step 710, the compute capsule is promoted to first class object status. Thereafter, the compute capsule is allocated resources at step 720. Then, the resources are distributed among the capsule members at step 730. The distribution of resources between capsule members in one embodiment is performed by the capsule itself. In another embodiment, the distribution of resources among the capsule members is performed by the operating system.

Embodiment of Computer Execution Environment (Hardware)

Figure 8:
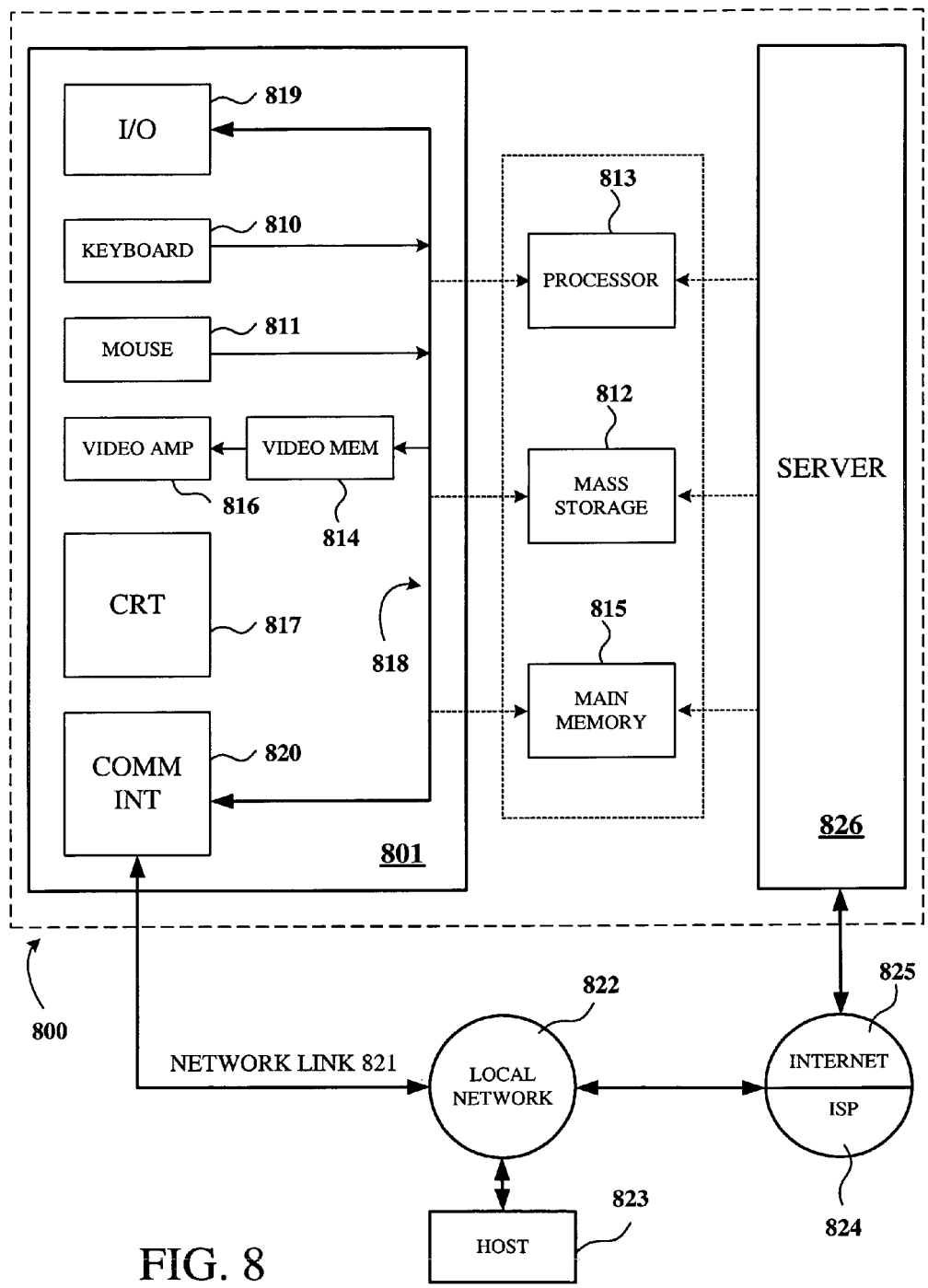
FIG. 8 is an embodiment of a computer execution environment in which one or more embodiments of the present invention can be implemented.

An embodiment of the invention can be implemented as computer software in the form of computer readable program code executed in a general purpose computing environment such as environment 800 illustrated in FIG. 8, or in the form of bytecode class files executable within a Java™ ran time environment running in such an environment, or in the form of bytecodes running on a processor (or devices enabled to process bytecodes) existing in a distributed environment (e.g., one or more processors on a network). A keyboard 810 and mouse 811 are coupled to a system bus 818. The keyboard and mouse are for introducing user input to the computer system and communicating that user input to central processing unit (CPU) 813. Other suitable input devices maybe used in addition to, or in place of, the mouse 811 and keyboard 810. I/O (input/output) unit 819 coupled to bidirectional system bus 818 represents such I/O elements as a printer, A/V (audio/video) I/O, etc.

Computer 801 may include a communication interface 820 coupled to bus 818. Communication interface 820 provides a two-way data communication coupling via a network link 821 to a local network 822. For example, if communication interface 820 is an integrated services digital network (ISDN card or a modem, communication interface 820 provides a data communication connection to the corresponding type of telephone line, which comprises part of network link 821. If communication interface 820 is a local area network (LAN) card, communication interface 820 provides a data communication connection via network link 821 to a compatible LAN. Wireless links are also possible. In any such implementation, communication interface 820 sends and receives electrical, electromagnetic or optical signals which carry digital data streams representing various types of information.

Network link 821 typically provides data communication through one or more networks to other data devices. For example, network link 821 may provide a connection through local network 822 to local server computer 823 or to data equipment operated by ISP 824. ISP 824 in turn provides data communication services through the world wide packet data communication network now commonly referred to as the "Internet" 825. Local network 822 and Internet 825 both use electrical, electromagnetic or optical signals which carry digital data streams. The signals through the various networks and the signals on network link 821 and through communication interface 820, which carry the digital data to and from computer 800, are exemplary forms of carrier waves transporting the information.

Processor 813 may reside wholly on client computer 801 or wholly on server 826 or processor 813 may have its computational power distributed between computer 801 and server 826. Server 826 symbolically is represented in FIG. 8 as one unit, but server 826 can also be distributed between multiple "tiers". In one embodiment, server 826 comprises a middle and back tier where application logic executes in the middle tier and persistent data is obtained in the back tier. In the case where processor 813 resides wholly on server 826, the results of the computations performed by processor 813 are transmitted to computer 801 via Internet 825, Internet Service Provider (ISP) 824, local network 822 and communication interface 820. In this way, computer 801 is able to display the results of the computation to a user in the form of output.

Computer 801 includes a video memory 814, main memory 815 and mass storage 812, all coupled to bidirectional system bus 818 along with keyboard 810, mouse 811 and processor 813. As with processor 813, in various computing environments, main memory 815 and mass storage 812, can reside wholly on server 826 or computer 801, or they may be distributed between the two. Examples of systems where processor 813, main memory 815, and mass storage 812 are distributed between computer 801 and server 826 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 812 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 32-bit data bus for transferring data between and among the components, such as processor 813, main memory 815, video memory 814 and mass storage 812. Alternatively, multiplex data/address lines maybe used instead of separate data and address lines.

In one embodiment of the invention, the processor 813 is a microprocessor manufactured by Motorola, such as the 680X0 processor or a microprocessor manufactured by Intel, such as the 80X86, or Pentium processor, or a SPARC microprocesor from Sun Micrsistem, Inc. However any other suitable microprocessor or microcomputer may be utilized. Main memory 815 is comprised of dynamic random access memory (DRAM). Video memory 814 is a dual-ported video random access memory. One port of the video memory 814 is coupled to video amplifier 816. The video amplifier 816 is used to drive the cathode ray tube (CRT) raster monitor 817. Video amplifier 816 is well known in the art and maybe implemented byanysuitable apparatus. This circuitry converts pixel data stored in video memory 814 to a raster signal suitable for use by monitor 817. Monitor 817 is a type of monitor suitable for displaying graphic images.

Computer 801 can send messages and receive data, including program code, through the network(s), network link 821, and communication interface 820. In the Internet example, remote server computer 826 might transmit a requested code for an application program through Internet 825, ISP 824, local network 822 and communication interface 820. The received code may be executed by processor 813 as it is received, and/or stored in mass storage 812, or other non-volatile storage for later execution. In this manner, computer 800 may obtain application code in the form of a carrier wave. Alternatively, remote server computer 826 may execute applications using processor 813, and utilize mass storage 812, and/or video memory 815. The results of the execution at server 826 are then transmitted through Internet 825, ISP 824, local network 822 and communication interface 820. In this example, computer 801 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Virtual Desktop System Architecture

Figure 9:
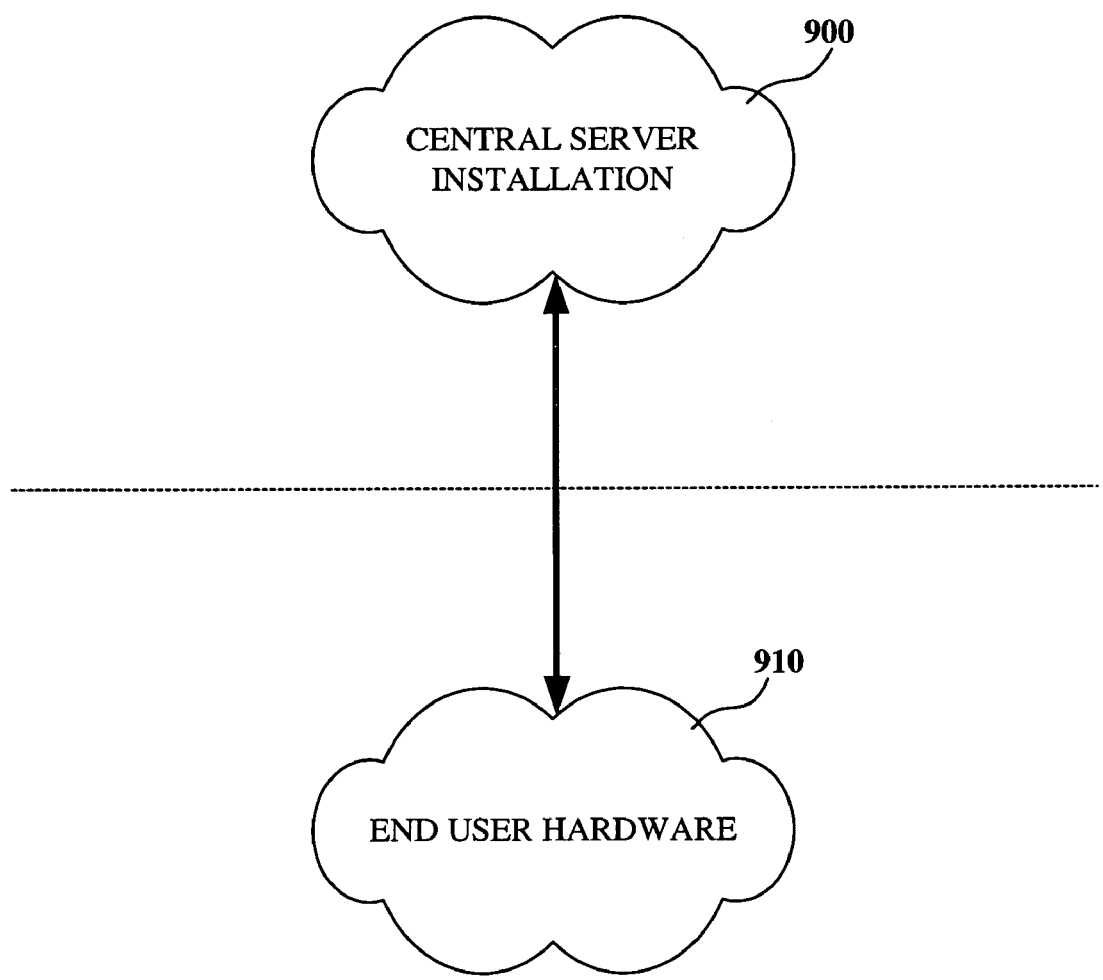
FIG. 9 shows an example of a thin client topology called a virtual desktop system architecture.

FIG. 9 shows an example of a thin client topology called a virtual desktop system architecture. The virtual desktop system architecture is one setting in which capsules are useful, but capsules are not limited to this setting. Capsules are also useful on standalone workstations, such as one that is described in connection with FIG. 8, and in a variety of other computing environments as well.

The virtual desktop system architecture provides a re-partitioning of functionality between a central server installation 900 and end user hardware 910. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

The functionality of the virtual desktop system is partitioned between a display and input device such as a remote system and associated display device, and data sources or services such as a host system interconnected to the remote system via a communication link. The display and input device is a human interface device (HID). The system is partitioned such that state and computation functions have been removed from the HID and reside on data sources or services. One or more services communicate with one or more HIDs through a communication link such as network. An example of such a system is illustrated in FIG. 10, wherein the system comprises computational service providers 1000 communicating data through communication link 1001 to HIDs 1002.

The computational power and state maintenance is provided by the service providers or services. The services are not tied to a specific computer, but may be distributed over one or more traditional desktop systems such as described in connection with FIG. 8, or with traditional servers. One computer may have one or more services, or a service may be implemented by one or more computers. The service provides computation, state and data to HIDs and the service is under the control of a common authority or manager. In FIG. 10, the services are provided by computers 1010, 1011, and 1012. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HD currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter could be used to provider video service, a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network. Any other local network may also be utilized. The invention also contemplates the use of wide area networks, the Internet, the world wide web, and others. The interconnect fabric maybe implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network with cooperative (as opposed to competing) network traffic. Dedicated or shared communications interconnects maybe used in the present invention.

The HID is the means by which users access the computational services provided by the services. FIG. 10 illustrates HIDs 1021, 1022 and 1023. Each HID comprises a display 1026, a keyboard 1024, mouse (not shown), and audio speakers (not shown). The HID includes the electronics need to interface these devices to the interconnection fabric and to transmit to and receive data from the services.

A block diagram of an example embodiment of the HID is illustrated in FIG. 11. The components of the HID are coupled internally to a PCI bus 1112. A network control block 1102 communicates to the interconnect fabric, such as an Ethernet, through line 1114. An audio codec 1103 receives audio data on interface 1116 and is coupled to block 1102. USB data communication is provided on lines 1113 to a USB controller 1101. The HID further comprises a embedded processor 1104 such as a Sparc2ep with coupled flash memory 1105 and DRAM 1106. The USB controller 1101, the network controller 1102 and the embedded processor 1104 are all coupled to the PCI bus 1112. A video controller 1109, also coupled to the PCI bus 1112, can include an ATI RagePro+ frame buffer controller which provides SVGA output on the line 1115. NTSC data is provided in and out of the video controller through video decoder 1110 and encoder 1111 respectively. A smartcard interface 1108 may also be coupled to the video controller 1109.

Alternatively, the HID can comprise a single chip implementation as illustrated in FIG. 12. The single chip includes the necessary processing capability implemented via CPU 1201 and graphics renderer 1205. Chip memory 1207 is provided, along with video controller/interface 1206. A internal bus (USB) controller 1202 is provided to permit communication to a mouse, keyboard and other local devices attached to the HID. A sound controller 1203 and interconnect interface 1204 are also provided. The video interface shares memory 1207 with the CPU 1201 and graphics renderer 1205. The software used in this embodiment may reside locally in non-volatile memory or it can be loaded through the interconnection interface when the device is powered.

The operation of the virtual desktop system architecture is described in co-pending U.S. patent application Ser. No. 09/063,335, filed Apr. 20,1998, entitled "Method and Apparatus for Providing A Virtual Desktop System Architecture" and assigned to the present assignee, and incorporated herein by reference.

Thus, aggregate resource management for active computing environments is described in conjunction with one or more specific embodiments. The invention is defined by the claims and their full scope of equivalents.

The invention claimed is:

1. A method for managing resources for an active computing environment comprising:
   encapsulating said active computing environment into a compute capsule, the compute capsule comprising a plurality of processes and their associated system environment, the encapsulating comprising partitioning an operating system so that host-dependant and personalized elements of the active computing environment are moved into the compute capsule while shared resources and a state necessary to manage them are excluded from the compute capsule;
   assigning system resources to said compute capsule, thereby collectively assigning said system resources to said plurality of processes.

2. The method of claim 1 wherein said system resources comprise a guaranteed share of resources.

3. The method of claim 1 wherein said assigning comprises applying a resource management algorithm.

4. The method of claim 1 wherein said assigning comprises restricting said compute capsule from accessing a network.

5. The method of claim 1 wherein said assigning comprises restricting said compute capsule from accessing a local file system.

6. The method of claim 1 wherein said assigning comprises allowing user-level control over allocation of the system resources among the plurality of processes in the compute capsule.

7. A system for managing computer resources, the system comprising:
   a compute capsule, the compute capsule comprising a plurality of processes and their associated system environment, the compute capsule further comprising host-dependant and personalized elements of operating system, wherein shared resources and a state necessary to manage them are excluded from the compute capsule;
   a resource manager configured to assign system resources to said compute capsule.

8. The system of claim 7 wherein said resource manager assigns a guaranteed share of resources to said compute capsule.

9. The system of claim 7 wherein said resource manager applies a resource management algorithm to said compute capsule.

10. The system of claim 7 wherein said resource manager restricts network access by said compute capsule.

11. The system of claim 7 wherein said resource manager restricts access to a local file system by said compute capsule.

12. The system of claim 7, said system allowing user-level control over allocation of the system resources among the plurality of processes in the compute capsule.

13. A computer program product comprising:
a computer usable medium having computer readable program code embodied therein configured to manage resources with respect to an active computing environment, said computer program product comprising:
computer readable code configured to cause a computer to encapsulate said active computing environment into a compute capsule, the active computing environment comprising a plurality of processes and their associated system environment, the encapsulating comprising partitioning an operating system so that host-dependant and personalized elements of the active computing environment are moved into the compute capsule while shared resources and a state necessary to manage them are excluded from the compute capsule; and
computer readable code configured to cause the computer to assign system resources to said compute capsule, thereby collectively assigning said system resources to said plurality of processes.

14. The computer program product of claim 13 wherein said system resources comprise a guaranteed share of resources.

15. The computer program product of claim 13 wherein said computer readable code configured to cause the computer to assign system resources comprises computer readable code configured to cause the computer to apply a resource management algorithm.

16. The computer program product of claim 13 wherein said computer readable code configured to cause the computer to assign system resources comprises computer readable code configured to cause the computer to restrict network access by said compute capsule.

17. The computer program product of claim 13 wherein said computer readable code configured to cause the computer to assign system resources comprises computer readable code configured to restrict access to a local file system by said compute capsule.

18. The computer program product of claim 13 wherein said computer readable code configured to cause the computer to assign system resources comprises computer readable code configured to allow user-level control over allocation of the system resources among the plurality of processes in the compute capsule.

* * * * *